US012724117B2

(12) United States Patent
Kim et al.

(10) Patent No.: US 12,724,117 B2
(45) Date of Patent: Sep. 1, 2026

(54) 4-DIMENSIONAL RADAR SIGNAL PROCESSING APPARATUS

(71) Applicant: SMART RADAR SYSTEM, INC., Seongnam-si (KR)

(72) Inventors: Soung On Kim, Seoul (KR); Gauvain Jacques Marseille, Siheung-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 435 days.

(21) Appl. No.: 17/535,661

(22) Filed: Nov. 25, 2021

(65) Prior Publication Data

US 2023/0161000 A1 May 25, 2023

(30) Foreign Application Priority Data

Nov. 24, 2021 (KR) ........................ 10-2021-0163167

(51) Int. Cl.
*G01S 7/41* (2006.01)
*G01S 13/42* (2006.01)

(52) U.S. Cl.
CPC ............... *G01S 7/411* (2013.01); *G01S 7/417* (2013.01); *G01S 13/42* (2013.01)

(58) Field of Classification Search
CPC ........... G01S 7/411; G01S 7/417; G01S 13/42
See application file for complete search history.

(56) References Cited

U.S. PATENT DOCUMENTS 9,165,383 B1 * 10/2015 Mendez-Rodriguez ..................... G06T 11/001
11,537,808 B2 12/2022 Crouch et al.
11,645,848 B2 5/2023 Nitsch et al.
12,039,436 B2 * 7/2024 Smolyanskiy ............ G06T 1/20
2009/0177089 A1 7/2009 Govari et al.
2019/0311546 A1 * 10/2019 Tay ......................... G06T 7/521
2019/0361126 A1 * 11/2019 Abari ................... H04N 23/698
2020/0034262 A1 * 1/2020 Bemanian ........... G06F 11/2242
2020/0043186 A1 * 2/2020 Selviah ..................... G06T 7/33
2020/0057891 A1 * 2/2020 Hayata ................... H04N 23/90
(Continued)

FOREIGN PATENT DOCUMENTS

CN 106842154 A * 6/2017 ............. G06V 10/56
CN 111401174 A * 7/2020 ......... G06K 9/00724
(Continued)

OTHER PUBLICATIONS

S. Sun and Y. D. Zhang, "4D Automotive Radar Sensing for Autonomous Vehicles: A Sparsity-Oriented Approach," in IEEE Journal of Selected Topics in Signal Processing, vol. 15, No. 4, pp. 879-891, Jun. 2021, doi: 10.1109/JSTSP.2021.3079626. (Year: 2021).*
(Continued)

*Primary Examiner* — William Kelleher
*Assistant Examiner* — Noah Yi Min Zhu

(57) ABSTRACT

In a point cloud of a 4-dimensional radar signal, Doppler information of each point is encoded with color information of that point. A 3-dimensional color point cloud is processed to recognize a shape of a target. A one-dimensional array feature vector generated by integration of feature maps extracted by processing 2-dimensional multi-view color point clouds with a convolution neural network (CNN) is processed by a recurrent neural network (RNN) to recognize the shape.

17 Claims, 6 Drawing Sheets

(56) References Cited

U.S. PATENT DOCUMENTS

| | | | | |
|---|---|---|---|---|
| 2020/0158856 | A1* | 5/2020 | Becker | G01S 13/867 |
| 2020/0174107 | A1* | 6/2020 | Briggs | H04N 23/90 |
| 2020/0292706 | A1* | 9/2020 | Hexsel | G01S 17/89 |
| 2021/0166065 | A1* | 6/2021 | Chang | G06T 7/0002 |
| 2021/0192345 | A1* | 6/2021 | Haase-Schuetz | G06F 16/2379 |
| 2021/0241026 | A1* | 8/2021 | Deng | G01S 7/497 |
| 2022/0083792 | A1* | 3/2022 | Naseer | G01S 17/86 |
| 2022/0291386 | A1* | 9/2022 | Canoglu | G01S 7/484 |
| 2022/0292699 | A1* | 9/2022 | Zhu | G06T 7/90 |
| 2022/0293276 | A1* | 9/2022 | Orlovsky | G16H 50/30 |
| 2023/0154171 | A1* | 5/2023 | Lee | G06N 3/063<br>382/157 |
| 2024/0094399 | A1* | 3/2024 | Pazhayampallil | B60W 30/146 |
| 2024/0219567 | A1* | 7/2024 | Kitano | G01S 17/50 |

FOREIGN PATENT DOCUMENTS

| | | | | | |
|---|---|---|---|---|---|
| KR | 10-2009-0075630 | A | | 7/2009 | |
| KR | 10-2021-0040415 | A | | 4/2021 | |
| KR | 10-2021-0057358 | A | | 5/2021 | |
| KR | 10-2021-0082281 | A | | 7/2021 | |
| WO | WO-2022195954 | A1 | * | 9/2022 | |
| WO | WO-2022206517 | A1 | * | 10/2022 | |
| WO | WO-2022211794 | A1 | * | 10/2022 | G06N 3/044 |

OTHER PUBLICATIONS

"What Is 4D Imaging Radar?" Aptiv, Sep. 9, 2021, www.aptiv.com/en/insights/article/what-is-4d-imaging-radar. (Year: 2021).*

I. Periša et al., "Doppler video for surveillance radars," 2015 16th International Radar Symposium (IRS), Dresden, Germany, 2015, pp. 120-124, doi: 10.1109/IRS.2015.7226297. (Year: 2015).*

Hang Su et al., Multi-view Convolutional Neural Networks for 3D Shape Recognition, Proceedings of the IEEE International Conference on Computer Vision (ICCV), 2015, pp. 945-953.

Notice of Allowance mailed Mar. 15, 2024 from the Korean Patent Office for Application No. 10-2021-0163167.

* cited by examiner

FIG. 2

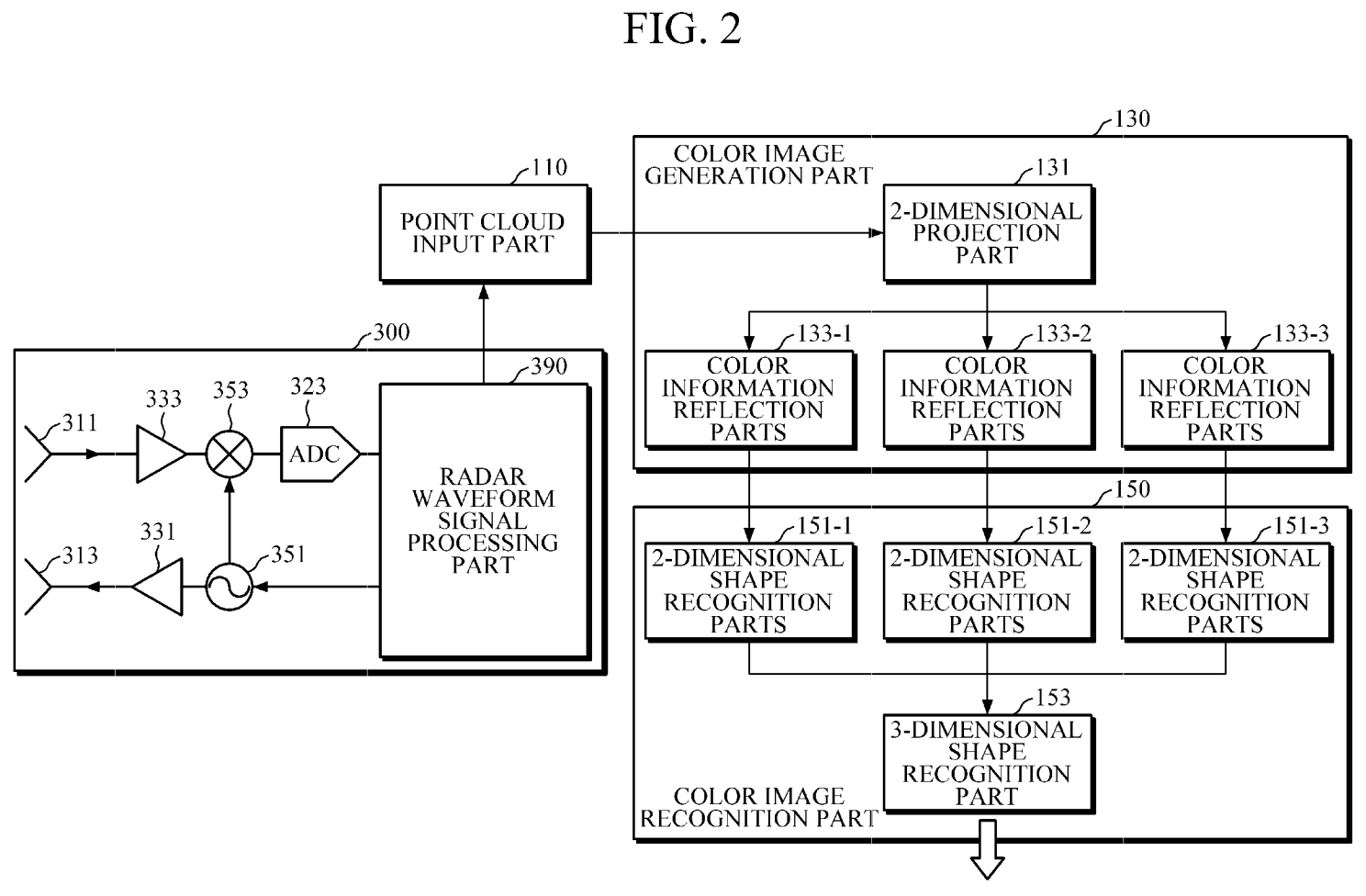

130
COLOR IMAGE GENERATION PART
131
2-DIMENSIONAL PROJECTION PART
133-1
COLOR INFORMATION REFLECTION PARTS
133-2
COLOR INFORMATION REFLECTION PARTS
133-3
COLOR INFORMATION REFLECTION PARTS
150
COLOR IMAGE RECOGNITION PART
151-1
2-DIMENSIONAL SHAPE RECOGNITION PARTS
151-2
2-DIMENSIONAL SHAPE RECOGNITION PARTS
151-3
2-DIMENSIONAL SHAPE RECOGNITION PARTS
153
3-DIMENSIONAL SHAPE RECOGNITION PART
110
POINT CLOUD INPUT PART
300
390
RADAR WAVEFORM SIGNAL PROCESSING PART
323
ADC
353
351
333
331
311
313

FIG. 4

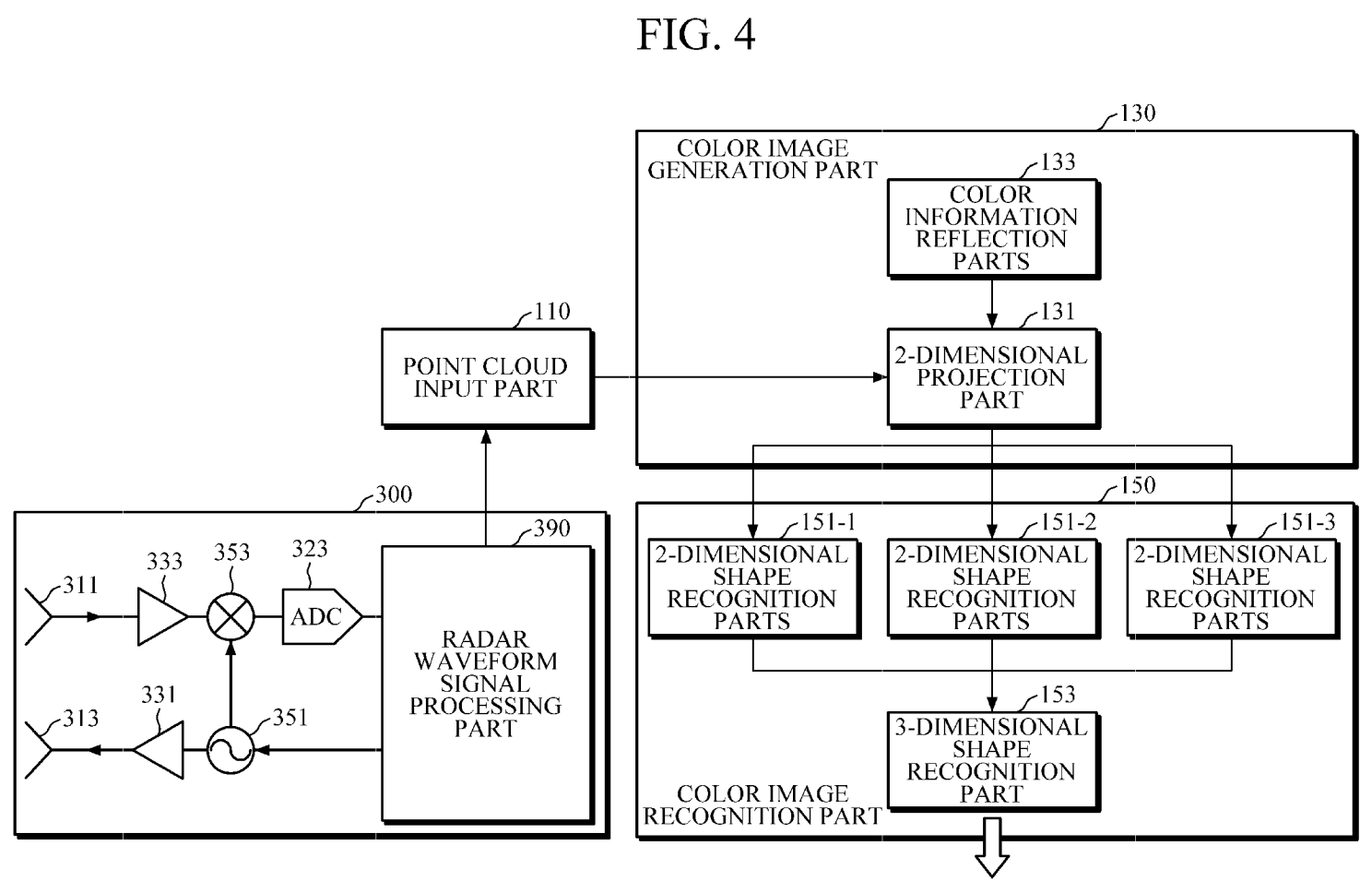

130
COLOR IMAGE GENERATION PART
133 COLOR INFORMATION REFLECTION PARTS
131 2-DIMENSIONAL PROJECTION PART

150
COLOR IMAGE RECOGNITION PART
151-1 2-DIMENSIONAL SHAPE RECOGNITION PARTS
151-2 2-DIMENSIONAL SHAPE RECOGNITION PARTS
151-3 2-DIMENSIONAL SHAPE RECOGNITION PARTS
153 3-DIMENSIONAL SHAPE RECOGNITION PART

110 POINT CLOUD INPUT PART 300
390 RADAR WAVEFORM SIGNAL PROCESSING PART
323 ADC
351
353
333
331
311
313

FIG. 6

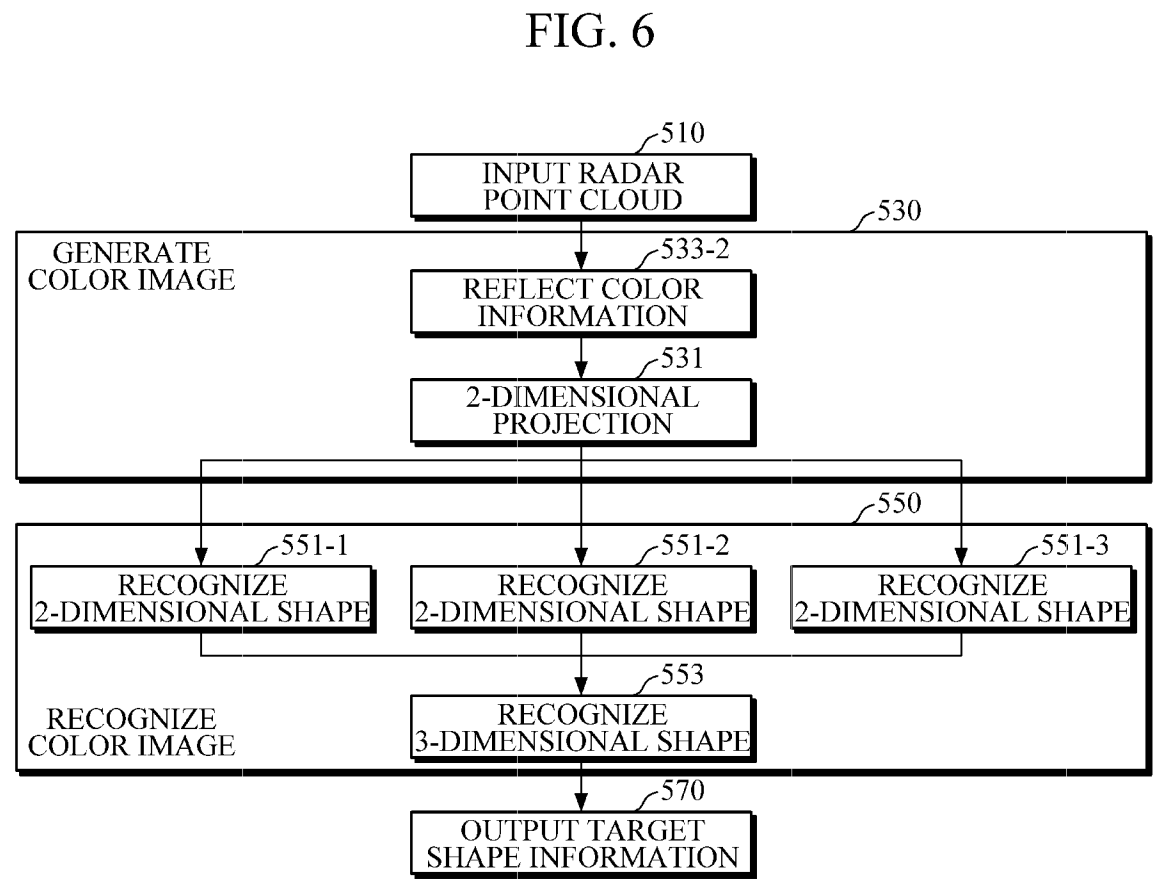

510 INPUT RADAR POINT CLOUD

530 GENERATE COLOR IMAGE 533-2 REFLECT COLOR INFORMATION 531 2-DIMENSIONAL PROJECTION

550 RECOGNIZE COLOR IMAGE 551-1 RECOGNIZE 2-DIMENSIONAL SHAPE 551-2 RECOGNIZE 2-DIMENSIONAL SHAPE 551-3 RECOGNIZE 2-DIMENSIONAL SHAPE

553 RECOGNIZE 3-DIMENSIONAL SHAPE

570 OUTPUT TARGET SHAPE INFORMATION

4-DIMENSIONAL RADAR SIGNAL PROCESSING APPARATUS

This application claims priority from Korean Patent Application No. 10-2021-0163167, filed on Nov. 24, 2021, in the Korean Intellectual Property Office, the disclosure of which is incorporated herein by reference in its entirety.

BACKGROUND

1. Field

The following description relates to a radar, specifically, a technology related to signal processing of a 4-dimensional radar.

2. Description of Related Art

Technologies for recognizing a target, for example, a shape of a human, by processing an image are known. However, recognizing a shape of a 3-dimensional object from a 2-dimensional image acquired by a sensor such as a camera is often difficult. As 3-dimensional scanning using a lidar or depth camera becomes common, technologies for recognizing a shape from a point cloud are developing. The point cloud is distribution of points in space, and each point has coordinate information in space. Technologies for recognizing the shape of a target by processing a 3-dimensional point cloud with a deep neural network includes, for example, technologies disclosed in, by Hang Su et al., Multi-view Convolutional Neural Networks for 3D Shape Recognition, Proceedings of the IEEE International Conference on Computer Vision (ICCV), 2015, pp. 945-953. However, in subtleties such as distinguishing between sitting and falling of a human, even these 3-dimensional point cloud recognition technologies fail to provide reliable results.

A 4-dimensional radar outputs the 3-dimensional point cloud in which each point has Doppler information. The point cloud output by the 4-dimensional radar has additional Doppler information, but no attempt has been made to improve shape recognition by taking this information into account.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a new signal processing technology of a 4-dimensional radar signal.

Further, the following description relates to a new method for processing the 4-dimensional radar signal using a conventional image processing technology.

In one general aspect, Doppler information of each point of a 4-dimensional radar signal is encoded with color information of that point.

In another general aspect, a one-dimensional array feature vector generated by integration of feature maps extracted by processing 2-dimensional multi-view color point clouds with a convolution neural network (CNN) is processed by a recurrent neural network (RNN) to recognize the shape.

Other features and aspects will be apparent from the following detailed description, the drawings, and the claims.

BRIEF DESCRIPTION OF THE DRAWINGS

FIG. 2 is a block diagram illustrating a configuration of a 4-dimensional radar signal processing apparatus according to another embodiment.

FIG. 4 is a block diagram illustrating a configuration of a 4-dimensional radar signal processing apparatus according to still another embodiment.

FIG. 6 is a flowchart illustrating a method of processing a 4-dimensional radar signal according to another embodiment.

Figure 1:
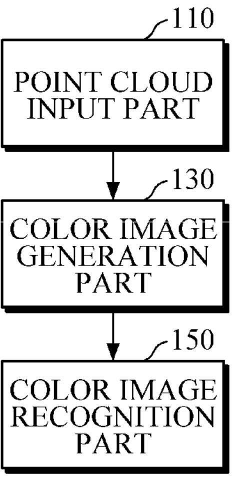
FIG. 1 is a block diagram illustrating a configuration of a 4-dimensional radar signal processing apparatus according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects are embodied through the embodiments described with reference to the accompanying drawings. It is understood that the components of each embodiment may be variously combined within one embodiment or components of another embodiment unless otherwise mentioned or contradicted by each other. The terms used in the specification and the claims should be interpreted as meanings and concepts consistent with the invention or the proposed technical spirit based on the principle that the inventor may appropriately define the concept of a term to describe the invention thereof in the best way. Hereinafter, preferable embodiments of the present invention will be described in detail with reference to the accompanying drawings.

FIG. 1 is a block diagram illustrating a configuration of a 4-dimensional radar signal processing apparatus according to one embodiment. In one embodiment, the 4-dimensional radar signal processing apparatus is implemented as a signal processing circuit connected to an output terminal of a radar. However, the proposed invention is not limited thereto, and it may be, for example, a circuit applied to a fall sensing apparatus installed at home, hospital, school, or the like to sense a fall accident. In one embodiment, the fall sensing apparatus may include a patch array antenna including a plurality of transmission and reception antennas, and a signal processing circuit which generates and supplies a radar waveform signal for each transmission antenna, and processes a signal received from the reception antenna. The 4-dimensional radar signal processing apparatus according to the proposed invention may be implemented as a part of this signal processing circuit.

As shown in the drawings, the 4-dimensional radar signal processing apparatus according to one embodiment includes a radar point cloud input part 110, a color image generation part 130, and a color image recognition part 150. The radar point cloud input part 110 receives a point cloud and a Doppler value for each point of the point cloud from the 4-dimensional radar. The radar point cloud input part 110 may be a serial host interface between a microprocessor and a digital signal processor. As another example, in the radar point cloud input part 110, a radar waveform signal processor which processes the radar waveform signal to output the Doppler value for each point of the point cloud and the point cloud accesses one side thereof, and the other side may be a dual port memory accessed by the signal processing circuit including the color image generation part 130 and the color image recognition part 150 according to the proposed invention. As still another example, the radar point cloud input part 110 may be implemented as a direct memory access (DMA) controller and a bus which transmit large amounts of data between processors.

According to one aspect of the proposed invention, Doppler information of each point of the 4D radar signal is encoded with color information of that point. The color image generation part 130 generates the color information of the point cloud by determining a color value for each point mapped to the Doppler value of each point. The point cloud output from the radar includes only coordinate values, but in the color image generation part 130, the point cloud is converted into a color point cloud in which each point has the color information. Here, the Doppler value may be a radial velocity value output from the radar. In one embodiment, it may be mapped to one of determined colors according to a range of the Doppler value. For example, only two reference values of Doppler are determined, and one of three colors of red (R), green (G), and blue (B) may be mapped according to the range of the Doppler value based on the reference values. In this case, each point of the color point cloud may be information in which 2 bits, which represent a color, are added to three coordinate values of a 3-dimensional orthogonal coordinate system represented by 8 bits, respectively.

The color image recognition part 150 may be, for example, implemented as multi-view convolutional neural networks mentioned, by Hang Su et al., in the above-described paper. The multi-view convolutional neural networks generate n multi-view 2-dimensional color point clouds by projecting an input 3-dimensional color point cloud onto n planes, and respectively process the n multi-view 2-dimensional color point clouds using a learned convolutional neural network (CNN). Feature maps are respectively extracted from the convolutional neural networks to generate a single descriptor which describes the 3-dimensional color point cloud through view pooling, and this is processed using a final convolutional neural network to recognize a shape.

FIG. 2 is a block diagram illustrating a configuration of a 4-dimensional radar signal processing apparatus according to another embodiment. As shown in the drawings, the 4-dimensional radar signal processing apparatus according to another embodiment includes a radar point cloud input part 110, a color image generation part 130, and a color image recognition part 150. In the additionally illustrated embodiment, the 4-dimensional radar signal processing apparatus includes a radar circuit part 300. Although the radar circuit part 300 of the illustrated embodiment adopts a frequency-modulated continuous wave radar (FMCW) method, the proposed invention may be applied to other types of radar. As shown in the drawings, in the radar circuit part 300 according to one embodiment, a variable frequency oscillator 351 generates an FMCW radar waveform transmission signal according to a modulation/demodulation control signal of a radar waveform signal processing part 390. For example, the variable frequency oscillator 351 generates and outputs an FMCW radar waveform signal in which a frequency linearly rises and then falls during a period called a chirp according to the modulation/demodulation control signal. The frequency modulation signal oscillated by the variable frequency oscillator 351 is transmitted to a transmission antenna 313 through a power amplifier 331. The FMCW radar waveform signal transmitted through the transmission antenna 313 is reflected by a target and received by a reception antenna 311.

In one embodiment, a transmission antenna 17 and a reception antenna 15 are implemented as micro patch antennas. Although the illustrated embodiment shows only one transmission antenna and one reception antenna, this is only an example, and a plurality of transmission antennas and reception antennas may be provided in different numbers. A distance to the target and a radial velocity may be measured by comparing the FMCW radar waveform signal transmitted from one transmission antenna and the FMCW radar waveform signal received through one reception antenna to measure a delay value and a Doppler shift. The distance to the target and the radial velocity may be calculated for each channel composed of a pair of one transmission antenna and one reception antenna. Further, angular displacement may be measured through the plurality of transmission antennas and reception antennas.

The FMCW radar waveform signal received by the reception antenna 311 is amplified by a low-noise amplifier 333, demodulated by a demodulator 353, and converted to a baseband signal, and then is converted to a digital signal by an analog-digital converter 323 to be input to the radar waveform signal processing part 390. The radar waveform signal processing part 390 detects and tracks the target to output Doppler and coordinates of the target by processing the baseband signal. A virtual antenna array may be configured from a plurality of transmission antenna and reception antenna pairs, and the point cloud and the Doppler value of each point may be output from the above. The radar waveform signal processing part 390 may be implemented with program instructions executed in the same digital signal processor which processes the color image generation part 130 and the color image recognition part 150.

The radar point cloud input part 110 receives the point cloud and the Doppler value for each point of the point cloud from the radar circuit part 300. Since the radar point cloud input part 110 is similar to the embodiment in FIG. 1, detailed descriptions thereof will be omitted.

According to one aspect of the proposed invention, Doppler information of each point of the 4D radar signal is encoded with color information of that point. The color image generation part 130 generates the color information of the point cloud by determining a color value for each point mapped to the Doppler value of each point. The point cloud output from the radar includes only the coordinate values, but in the color image generation part 130, the point cloud is converted into a color point cloud in which each point has the color information. Here, the Doppler value may be a radial velocity value output from the radar.

In the illustrated embodiment, the color image generation part 130 includes a 2-dimensional projection part 131 and three color information reflection parts 133-1, 133-2, and 133-3. The 2-dimensional projection part 131 generates three 2-dimensional point clouds each projected from a 3-dimensional point cloud in at least two different directions, in this case, in three-axis directions orthogonal to each other. That is, in the illustrated embodiment, the 2-dimensional projection part 131 generates three 2-dimensional point clouds by projecting the 3-dimensional point cloud on an x-axis plane, a y-axis plane, and a z-axis plane, respectively. Generally, the 2-dimensional projection part 131 may generate n 2-dimensional point clouds by projecting onto n planes surrounding a target. Each of the color information reflection parts 133-1, 133-2, and 133-3 generates the 2-dimensional color point cloud by determining the color value for each point mapped to the Doppler value of the point of each of the 2-dimensional point clouds. In one embodiment, it may be mapped to one of determined colors according to a range of the Doppler value. For example, only two reference values of Doppler are determined, and one of three colors of red (R), green (G), and blue (B) may be mapped according to the range of the Doppler value based on the reference values. In this case, each point of the color point cloud may be information in which 2 bits, which represent the color, are added to three coordinate values of a 3-dimensional orthogonal coordinate system represented by 8 bits, respectively. Generally, the color information reflection parts 133 may receive the 2-dimensional point clouds and map the Doppler value of each point to one of n color values which may be met while continuously changing in a chromaticity coordinate system according to the range of the value.

2-dimensional shape recognition parts 151-1, 151-2, and 151-3 recognize the shape of the target in each direction by respectively processing the 2-dimensional color point clouds. In one embodiment, the 2-dimensional shape recognition part is implemented as a convolutional neural network learned for a target point cloud in the corresponding direction.

A 3-dimensional shape recognition part 153 recognizes the shape of the target from the output of the 2-dimensional shape recognition parts 151-1, 151-2, and 151-3.

Figure 3:
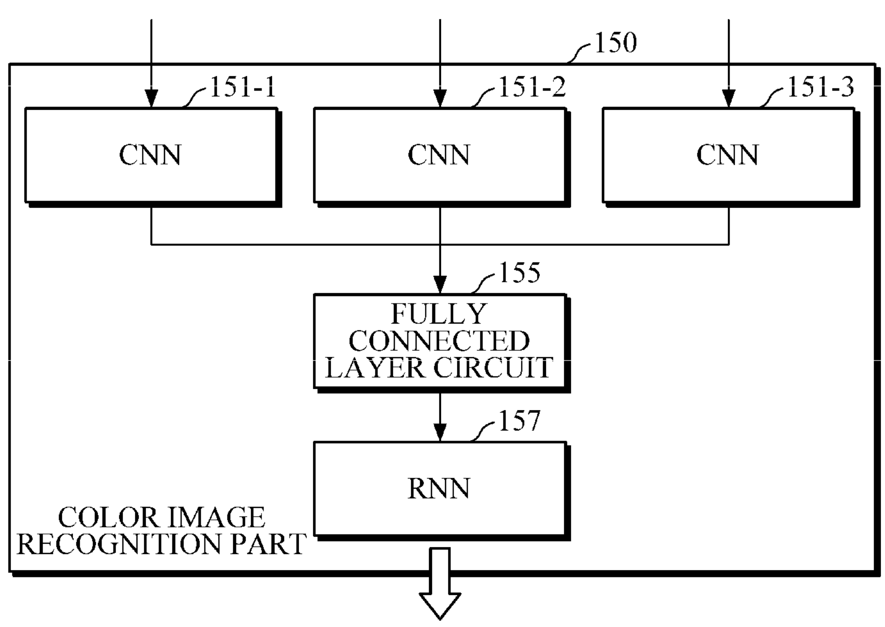
FIG. 3 is a block diagram illustrating a configuration of a color image recognition part according to one embodiment.

According to an additional aspect, a one-dimensional array feature vector generated by integrating the feature maps extracted by processing the 2-dimensional multi-view color point clouds using the CNN is processed by a recurrent neural network (RNN) to recognize the shape. FIG. 3 is a block diagram illustrating a configuration of a color image recognition part according to one embodiment to which this aspect is applied. In the illustrated embodiment, the color image recognition part 150 includes a plurality of convolutional neural networks 151-1, 151-2, and 151-3, a fully connected layer circuit 155, and a recurrent neural network 157. The convolutional neural networks recognize the shape of the target in each direction by respectively processing the 2-dimensional color point clouds. The feature maps are extracted and output from each of the convolutional neural networks 151-1, 151-2, and 151-3. The fully connected layer circuit 155 receives the feature maps extracted from the 2-dimensional color point clouds, and outputs the feature maps by integrating the feature maps into a one-dimensional array feature vector. This integrated feature vector is input to the recurrent neural network 157 to recognize the shape of the target.

In the case of a change from a sitting position to a lying position or a change from a standing position to a sitting or lying position, determining whether an accidental fall has occurred or a position has been changed by one's own free will has long remained a difficult problem. The applicant improved this by adding the Doppler information additionally included in the radar sensor compared to other sensors to a still image frame. In addition, in order to overcome a weak point of the radar sensor, that is, a phenomenon in which the point cloud of that part disappears when a part of the target stops, a multi-view deep neural network structure which processes the integrated feature vector using a recurrent neural network has been proposed.

FIG. 4 is a block diagram illustrating a configuration of a 4-dimensional radar signal processing apparatus according to still another embodiment. As shown in the drawings, the 4-dimensional radar signal processing apparatus according to still another embodiment includes a radar point cloud input part 110, a color image generation part 130, and a color image recognition part 150. In the additionally illustrated embodiment, the 4-dimensional radar signal processing apparatus includes a radar circuit part 300. Since the radar circuit part 300 and the radar point cloud input part 110 of the illustrated embodiment are similar to the embodiment in FIG. 2, detailed descriptions thereof will be omitted.

The color image generation part 130 generates the color information of the point cloud by determining a color value for each point mapped to the Doppler value of each point. In the illustrated embodiment, the color image generation part 130 includes a color information reflection part 133, and a 2-dimensional projection part 131. The color information reflection part 133 generates 3-dimensional color point clouds by determining the color value for each point mapped to the Doppler value of each of the 3-dimensional point clouds. The point cloud output from the radar includes only coordinate values, but in the color information reflection part 133, the point cloud is converted into a color point cloud in which each point has the color information. Here, the Doppler value may be a radial velocity value output from the radar. In one embodiment, it may be mapped to one of determined colors according to a range of the Doppler value. For example, only two reference values of Doppler are determined, and one of three colors of red (R), green (G), and blue (B) may be mapped according to the range of Doppler value based on the reference values. In this case, each point of the color point cloud may be information in which 2 bits, which represent a color, are added to three coordinate values of a 3-dimensional orthogonal coordinate system represented by 8 bits, respectively. Generally, the color information reflection part 133 may receive the 3-dimensional point clouds and map the Doppler value of each point to one of n color values which may be met while continuously changing in a chromaticity coordinate system according to the range of the value.

The 2-dimensional projection part 131 generates three 2-dimensional point clouds each projected from the 3-dimensional color point cloud in at least two different directions, in this case, in three-axis directions orthogonal to each other. That is, in the illustrated embodiment, the 2-dimensional projection part 131 generates the three 2-dimensional point clouds by projecting the 3-dimensional point cloud on an x-axis plane, a y-axis plane, and a z-axis plane, respectively. Generally, the 2-dimensional projection part 131 may generate n 2-dimensional point clouds by projecting onto n planes surrounding the target.

2-dimensional shape recognition parts 151-1, 151-2, and 151-3 recognize the shape of the target in each direction by respectively processing the 2-dimensional color point clouds. In one embodiment, the 2-dimensional shape recognition part is implemented as a convolutional neural network learned for a target point cloud in the corresponding direction. A 3-dimensional shape recognition part 153 recognizes the shape of the target from the output of the 2-dimensional shape recognition parts 151-1, 151-2, and 151-3. Like the above-described embodiment, the color image recognition part 150 may have a structure similar to that shown in FIG. 3. Since this has been described above, descriptions thereof will be omitted.

Figure 5:
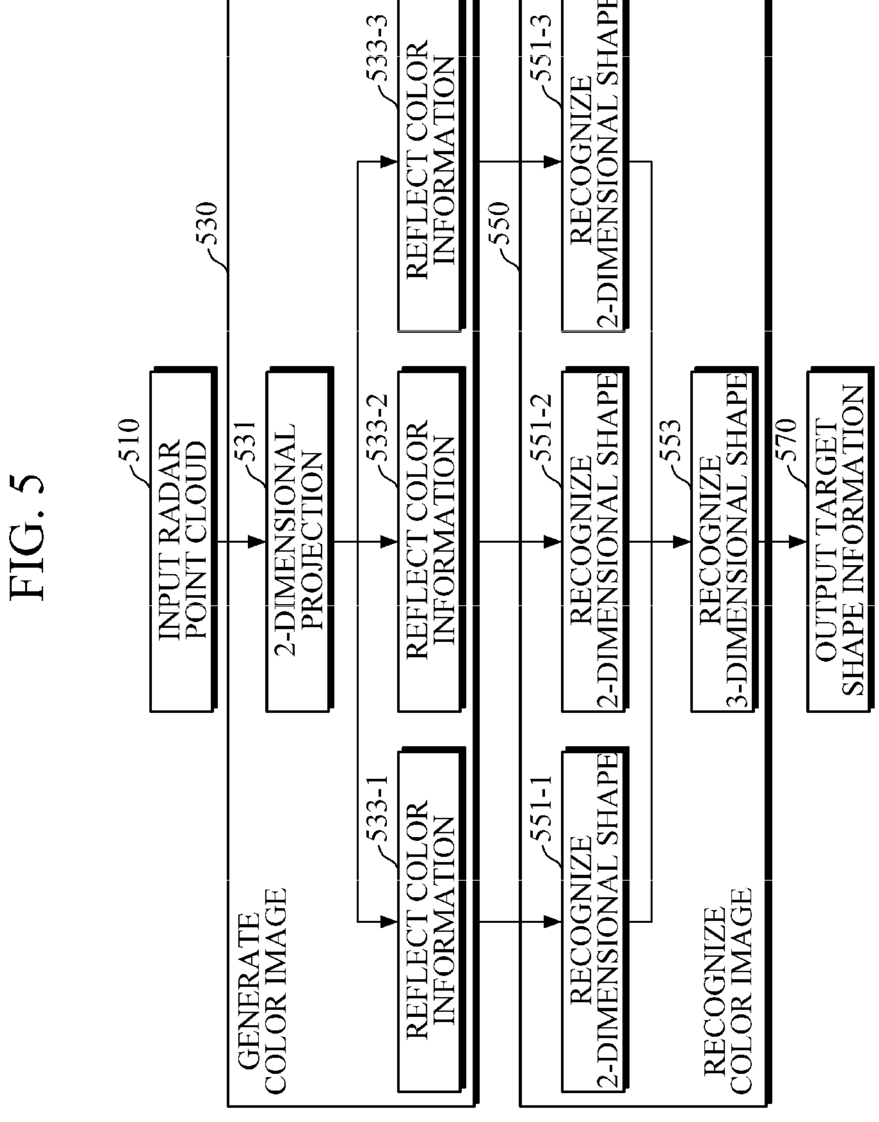
FIG. 5 is a flowchart illustrating a method of processing a 4-dimensional radar signal according to one embodiment.

FIG. 5 is a flowchart illustrating a method of processing a 4-dimensional radar signal according to one embodiment. The method of processing a 4-dimensional radar signal according to one embodiment may be executed in a signal processing processor which processes position coordinates and Doppler information output from a radar signal processing circuit, and dedicated circuits. Some of the configuration may be realized by program instructions executed by a processor, such as a microprocessor, a signal processing processor, a graphic processor, or the like. The remainder, for example, a convolutional neural network (CNN) or a recurrent neural network (RNN) may be implemented as a plurality of dedicated circuits which are concurrently executed. Here, computational elements which execute this method are collectively referred to as a 'signal processor'.

In one embodiment, the method of processing a 4-dimensional radar signal includes a radar point cloud input operation 510, a color image generation operation 530, and a color image recognition operation 550. In the radar point cloud input operation 510, the signal processor receives a point cloud and a Doppler value for each point of the point cloud from a 4-dimensional radar. In the color image generation operation 530, the signal processor generates the color information of the point cloud by determining a color value for each point mapped to the Doppler value of each point.

In the color image recognition operation 550, the signal processor generates n multi-view 2-dimensional color point clouds by projecting an input 3-dimensional color point cloud onto n planes, and respectively processes the n multi-view 2-dimensional color point clouds using a learned convolutional neural network (CNN). Feature maps are respectively extracted from these convolutional neural networks to generate a single descriptor which describes the 3-dimensional color point cloud through view pooling, and this is processed using a final convolutional neural network to recognize a shape. Since the operations thereof have been described with reference to FIG. 1, detailed descriptions will be omitted.

In the illustrated embodiment, the color image generation operation 530 includes a 2-dimensional projection operation 531, and three color information reflection operations 533-1, 533-2, and 533-3. In the 2-dimensional projection operation 531, the signal processor generates three 2-dimensional point clouds each projected from a 3-dimensional point cloud in at least two different directions, in this case, in three-axis directions orthogonal to each other. That is, in the illustrated embodiment, in the 2-dimensional projection operation 531, the signal processor generates the three 2-dimensional point clouds by projecting the 3-dimensional point cloud on an x-axis plane, a y-axis plane, and a z-axis plane, respectively. Generally, in the 2-dimensional projection operation 531, the signal processor may generate n 2-dimensional point clouds by projecting onto n planes surrounding the target. In the color information reflection operations 533-1, 533-2, and 533-3, each of the signal processors generates the 2-dimensional color point cloud by determining the color value for each point mapped to the Doppler value of the point of each of the 2-dimensional point clouds.

In 2-dimensional shape recognition operations 551-1, 551-2, and 551-3, the signal processors recognize the shape of the target in each direction by respectively processing the 2-dimensional color point clouds of each viewpoint. In one embodiment, in the 2-dimensional shape recognition operations, the signal processor is implemented as a convolutional neural network learned for a target point cloud in the corresponding direction.

In a 3-dimensional shape recognition operation 553, the signal processor recognizes the shape of the target from the output of the 2-dimensional shape recognition operations 551-1, 551-2, and 551-3. Since the operations thereof have been described with reference to FIG. 2, detailed descriptions will be omitted.

According to an additional aspect, a one-dimensional array feature vector generated by integrating the feature maps extracted by processing the 2-dimensional multi-view color point clouds using the CNN is processed by the recurrent neural network (RNN) to recognize the shape. In the illustrated embodiment, the 2-dimensional shape recognition operations are processed by the convolutional neural network. The convolutional neural networks recognize the shape of the target in each direction by respectively processing the 2-dimensional color point clouds. The feature maps are extracted and output from each of the convolutional neural networks. In the 3-dimensional shape recognition operation 553, first, the feature maps are processed by a fully connected layer circuit to output a one-dimensional array feature integrated vector. This integrated feature vector is input to the recurrent neural network to recognize the shape of the target. Since the operations thereof have been described with reference to FIG. 3, detailed descriptions will be omitted.

FIG. 6 is a flowchart illustrating a method of processing a 4-dimensional radar signal according to another embodiment. As shown in the drawings, the method of processing a 4-dimensional radar signal according to another embodiment includes a radar point cloud input operation 510, a color image generation operation 530, and a color image recognition operation 550. In the color image generation operation 530, the signal processor generates the color information of the point cloud by determining a color value for each point mapped to the Doppler value of each point. In the illustrated embodiment, in the color image generation operation 530, the signal processor includes a color information reflection operation 533 and a 2-dimensional projection operation 531. In the color information reflection operation 533, the signal processor generates 3-dimensional color point clouds by determining the color value for each point mapped to the Doppler value of each of the 3-dimensional point clouds. The point cloud output from the radar includes only coordinate values, but in the color information reflection operation 533, the point cloud is converted into a color point cloud in which each point has the color information. Here, the Doppler value may be a radial velocity value output from the radar. In one embodiment, it may be mapped to one of determined colors according to a range of the Doppler value. For example, only two reference values of Doppler are determined, and one of three colors of red (R), green (G), and blue (B) may be mapped according to the range of the Doppler value based on the reference values. In this case, each point of the color point cloud may be information in which 2 bits, which represent a color, are added to three coordinate values of a 3-dimensional orthogonal coordinate system represented by 8 bits, respectively. Generally, in the color information reflection operation 533, the signal processor may receive the 3-dimensional point clouds and map the Doppler value of each point to one of n color values which may be met while continuously changing in a chromaticity coordinate system according to the range of the value.

In the 2-dimensional projection operation 531, the signal processor generates three 2-dimensional point clouds each projected from the 3-dimensional color point cloud in at least two different directions, in this case, in three-axis directions orthogonal to each other. That is, in the illustrated embodiment, in the 2-dimensional projection operation 531, the signal processor generates the three 2-dimensional point clouds by projecting the 3-dimensional point cloud on an x-axis plane, a y-axis plane, and a z-axis plane, respectively. Generally, in the 2-dimensional projection operation 531, the signal processor may generate n 2-dimensional point clouds by projecting onto n planes surrounding the target.

In 2-dimensional shape recognition operations 551-1, 551-2, and 551-3, the signal processors recognize the shape of the target in each direction by respectively processing the 2-dimensional color point clouds. Since the operations thereof have been described with reference to FIG. 5, detailed descriptions will be omitted.

Doppler information of a radar is a radial velocity component, and thus can be viewed as a scalar value. In a point cloud clustered for each target object, the Doppler information has redundancy spatially and on a time axis similar to a color value while reflecting a shape. Accordingly, a color point cloud can be efficiently processed using a known image processing technology such as a deep neural network circuit which operates in a conventional 2-dimensional image field. The reliability of shape recognition can be improved by reflecting velocity information in addition to spatial position information.

Since the radar cannot detect a stationary target, when all or part of the target stops, a point cloud of the stationary part disappears. Due to this phenomenon different from an image, there is a limitation when processing the point cloud or color point cloud according to the proposed invention using a convolutional neural network. Since a one-dimensional array feature vector is processed using a recurrent neural network, it is possible to overcome limitations caused by the stationary part of the target.

In the above, although the present invention has been described with reference to the accompanying drawings, the present invention is not limited thereto, and should be understood to encompass various modifications which may be clearly derived by those skilled in the art. The claims are intended to encompass these modifications.

What is claimed is:

1. An apparatus for processing a 4-dimensional (4D) radar signal, the apparatus recognizing a shape of a target by transmitting and receiving the radar signal to and from the target, the apparatus comprising:

a radar point cloud input circuit configured to receive a point cloud representing the target, the point cloud comprising a plurality of points, and Doppler values for the respective points of the point cloud;

a color image generation circuit configured to determine a color value for each point of the plurality of points based on the Doppler values for the respective points to generate a color image of the target; and a color image recognition circuit configured to process the generated color image of the target to recognize the shape of the target, wherein the generated color image of the target comprises a plurality of color points each corresponding to the plurality of points of the point cloud, and at least two color points among the plurality of color points in the color image of the target have different color values, wherein the Doppler values are radial velocity values output from the radar signal, wherein the color image recognition circuit is further configured to generate feature maps of the target based on the generated color image, determine the shapes of the target based on the feature maps, and determine a posture of the target based on the shapes of the target.

2. The apparatus of claim 1, wherein:

the color image generation circuit includes a 2-dimensional projection circuit configured to generate at least two 2-dimensional point clouds each projected from a 3-dimensional point cloud to at least two different directional viewpoints, and at least two color information reflection circuits configured to determine the color value for each point based on the Doppler value of each point of the 2-dimensional point clouds to generate a 2-dimensional color point cloud; and the color image recognition circuit includes at least two 2-dimensional shape recognition circuits configured to process the 2-dimensional color point cloud of each viewpoint to recognize the shape of the target in each direction, and a 3-dimensional shape recognition circuit configured to recognize the shape of the target from an output of at least two 2-dimensional color image recognition circuits.

3. The apparatus of claim 2, wherein the 3-dimensional shape recognition circuit includes:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

4. The apparatus of claim 1, wherein:

the color image generation circuit includes a color information reflection circuit configured to determine the color value for each point based on the Doppler value of each point of a 3-dimensional point cloud to generate a 3-dimensional color point cloud, and a 2-dimensional projection circuit configured to generate at least two 2-dimensional color point clouds each projected from the generated 3-dimensional color point cloud to at least two different directional viewpoints; and the color image recognition circuit includes at least two 2-dimensional shape recognition circuits configured to process the 2-dimensional color point cloud of each viewpoint to recognize the shape of the target in each direction, and a 3-dimensional shape recognition circuit configured to recognize the shape of the target from an output of at least two 2-dimensional color image recognition circuits.

5. The apparatus of claim 4, wherein the 3-dimensional shape recognition circuit includes:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

6. The apparatus of claim 1, wherein:

the posture comprises one of a sitting position, a lying position and a standing position.

7. The apparatus of claim 6, wherein:

the color image recognition circuit is further configured to determine whether the target has fallen based on a change in the posture of the target.

8. A method of processing a 4-dimensional (4D) radar signal processed by a radar signal processor, the method recognizing a shape of a target by transmitting and receiving the radar signal to and from the target, the method comprising:

a radar point cloud input operation of receiving a point cloud representing the target, the point cloud comprising a plurality of points, and Doppler values for the respective points of the point cloud;

a color image generation operation of determining a color value for each point of the plurality of points based on the Doppler values for the respective points to generate a color image of the target; and a color image recognition operation of processing the generated color image of the target to recognize the shape of the target, wherein the generated color image of the target comprises a plurality of color points each corresponding to the plurality of points of the point cloud, and at least two color points among the plurality of color points in the color image of the target have different color values, wherein the Doppler values are radial velocity values output from the radar signal, wherein the color image recognition operation further comprises:

generating feature maps of the target based on the generated color image, determining the shapes of the target based on the feature maps, and determining a posture of the target based on the shapes of the target.

9. The method of claim 8, wherein:

the color image generation operation includes a 2-dimensional projection operation of generating at least two 2-dimensional point clouds each projected from a 3-dimensional point cloud to at least two different directional viewpoints, and at least two color information reflection operations of determining the color value for each point based on the Doppler value of each point of the 2-dimensional point clouds to generate a 2-dimensional color point cloud; and the color image recognition operation includes at least two 2-dimensional shape recognition operations of processing the 2-dimensional color point cloud of each viewpoint to recognize the shape of the target in each direction, and a 3-dimensional shape recognition operation of recognizing the shape of the target from an output of at least two 2-dimensional color image recognition operations.

10. The method of claim 9, wherein the 3-dimensional shape recognition operation is executed by:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

11. The method of claim 8, wherein:

the color image generation operation includes a color information reflection operation of determining the color value for each point based on the Doppler value of each point of the 3-dimensional point cloud to generate a 3-dimensional color point cloud, and a 2-dimensional projection operation of generating at least two 2-dimensional color point clouds each projected from the generated 3-dimensional color point cloud to at least two different directional viewpoints; and the color image recognition operation includes at least two 2-dimensional shape recognition operations of processing the 2-dimensional color point cloud of each viewpoint to recognize the shape of the target in each direction, and a 3-dimensional shape recognition operation of recognizing the shape of the target from an output of at least two 2-dimensional color image recognition operations.

12. The method of claim 11, wherein the 3-dimensional shape recognition operation is executed by:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

13. An apparatus for processing a 4-dimensional (4D) radar signal, the apparatus recognizing a shape of a target by transmitting and receiving the radar signal to and from the target, the apparatus comprising:

a memory; and a processor, wherein the memory stores program instructions which cause the processor to perform:

a radar point cloud input operation of receiving a point cloud representing the target, the point cloud comprising a plurality of points, and Doppler values for the respective points of the point cloud;

a color image generation operation of determining a color value for each point of the plurality of points based on the Doppler values for the respective points to generate a color image of the target; and a color image recognition operation of processing the generated color image of the target to recognize the shape of the target, wherein the generated color image of the target comprises a plurality of color points each corresponding to the plurality of points of the point cloud, and at least two color points among the plurality of color points in the color image of the target have different color values, wherein the Doppler values are radial velocity values output from the radar signal, wherein the color image recognition operation further comprises:

generating feature maps of the target based on the generated color image, determining the shapes of the target based on the feature maps, and determining a posture of the target based on the shapes of the target.

14. The apparatus of claim 13, wherein:

the color image generation operation includes a 2-dimensional projection operation of generating at least two 2-dimensional point clouds each projected from a 3-dimensional point cloud to at least two different directional viewpoints, and at least two color information reflection operations of determining the color value for each point based on the Doppler value of each point of the 2-dimensional point clouds to generate a 2-dimensional color point cloud; and the color image recognition operation includes at least two 2-dimensional shape recognition operations of processing the 2-dimensional color point cloud of each viewpoint to recognize the shape of the target in each direction, and a 3-dimensional shape recognition operation of recognizing the shape of the target generated by the at least two 2-dimensional color image recognition operations.

15. The apparatus of claim 14, wherein the 3-dimensional shape recognition operation is executed by:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

16. The apparatus of claim 13, wherein:

the color image generation operation includes a color information reflection operation of determining the color value for each point based on the Doppler value of each point of the 3-dimensional point cloud to generate a 3-dimensional color point cloud, and a 2-dimensional projection operation of generating at least two 2-dimensional color point clouds each projected from the generated 3-dimensional color point cloud to at least two different directional viewpoints; and the color image recognition operation includes at least two 2-dimensional shape recognition operations of processing the 2-dimensional color point cloud of each viewpoint to recognize the shape of the target in each direction, and a 3-dimensional shape recognition operation of recognizing the shape of the target from an output of at least two 2-dimensional color image recognition operations.

17. The apparatus of claim 16, wherein the 3-dimensional shape recognition operation is executed by:

at least two convolutional neural networks configured to process the 2-dimensional color point cloud of each viewpoint to recognize the shape of the target in each direction;

a fully connected layer circuit configured to receive feature maps extracted from the convolutional neural networks to output a one-dimensional array feature vector; and a recurrent neural network configured to receive the one-dimensional array feature vector to recognize the shape of the target.

* * * * *